United States Patent
Chai et al.

(10) Patent No.: US 10,212,493 B2
(45) Date of Patent: Feb. 19, 2019

(54) FILTERING NOISE VALUES FROM TELEMETRY DATA

(71) Applicant: Mapbox, Inc., San Francisco, CA (US)

(72) Inventors: Lily Chai, San Francisco, CA (US); Morgan Herlocker, Oakland, CA (US)

(73) Assignee: MAPBOX, INC., San Francisco, CA (US)

( * ) Notice: Subject to any disclaimer, the term of this patent is extended or adjusted under 35 U.S.C. 154(b) by 0 days.

(21) Appl. No.: 15/419,910

(22) Filed: Jan. 30, 2017

(65) Prior Publication Data

US 2018/0220205 A1  Aug. 2, 2018

(51) Int. Cl.
*H04Q 9/00* (2006.01)

(52) U.S. Cl.
CPC .......... *H04Q 9/00* (2013.01); *G08C 2201/93* (2013.01); *H04Q 2209/40* (2013.01); *H04Q 2209/50* (2013.01); *H04Q 2209/823* (2013.01)

(58) Field of Classification Search
CPC ...................................................... H04Q 9/00
See application file for complete search history.

(56) References Cited

U.S. PATENT DOCUMENTS

| 2014/0244125 | A1* | 8/2014 | Dorum | G01C 21/32 701/70 |
| 2016/0258764 | A1* | 9/2016 | Phuyal | G01C 21/26 |
| 2016/0335923 | A1* | 11/2016 | Hofmann | G09B 29/003 |

\* cited by examiner

*Primary Examiner* — Amine Benlagsir
(74) *Attorney, Agent, or Firm* — Fenwick & West LLP

(57) ABSTRACT

In an embodiment, a data processing method providing an improvement in filtering telemetry data received from mobile devices comprises receiving, from a mobile device, telemetry data comprising a plurality of probes, each probe identifying a location of the mobile device at a time of the probe, wherein the plurality of probes form first digital trace data identifying a path of the mobile device; determining, for a particular probe of the plurality of probes, a first attribute of the particular probe; determining whether the first attribute of the particular probe satisfies a first threshold; in response to satisfying the first threshold, deleting the particular probe from the plurality of probes and dividing the first digital trace data into second digital trace data and third digital trace data; performing an action using the second digital trace data and the third digital trace data.

16 Claims, 4 Drawing Sheets

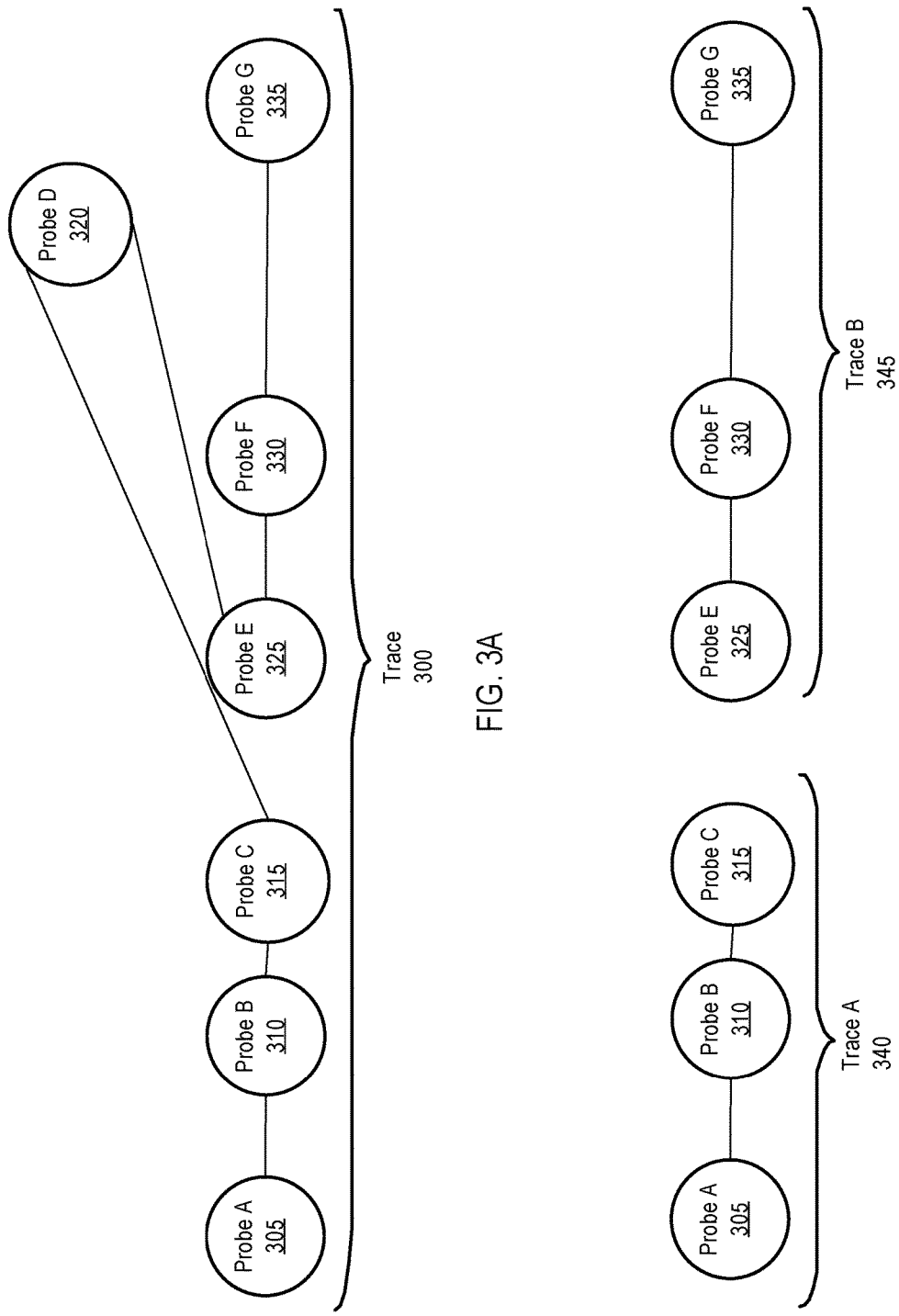

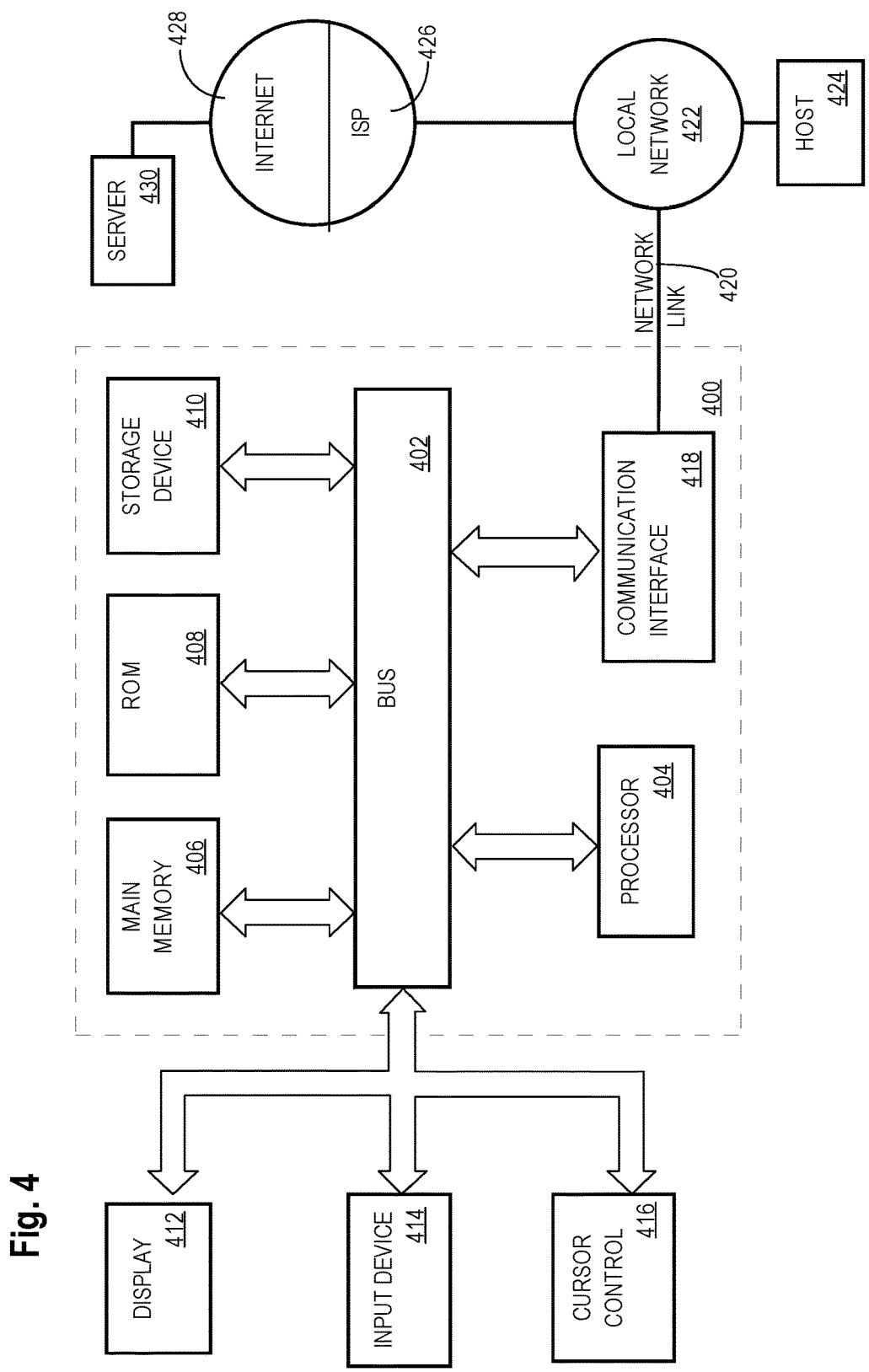

FILTERING NOISE VALUES FROM TELEMETRY DATA

TECHNICAL FIELD

The technical field of the present disclosure generally relates to improved methods, computer software and/or computer hardware in the field of electronic maps. The disclosure relates more specifically to improved computer-implemented methods for filtering noise from telemetry data.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Digitally stored electronic maps are used to provide directions to users of mobile devices, for example, using any of a wide array of standalone map or direction application programs or apps. Today's electronic maps correctly determine where a mobile device is within a few feet or meters, or show where the user of that mobile device is on the electronic map in real time. Electronic maps also typically include other functionality, such as providing turn-by-turn directions to nearly any location. Additional elements such as traffic or wrecks may also be shown.

Electronic maps also appear in other applications aside from standalone mapping applications. For example, ride sharing applications, taxi applications, video games, and other applications may use digital maps. These or other applications can obtain electronic maps by calling a map server computer through an Application Programming Interface (API). Thus, a single electronic map provider that owns or operates the server computer may supply the electronic maps for many different applications.

When a mobile device is using an electronic map, the location of the mobile device can be determined using WiFi or the Global Positioning System (GPS), which reports a device location using latitude and longitude, and optionally height and time as well. This location data, as well as other data, may be collected by the electronic map provider and may be termed "telemetry" data for the mobile device. However, there may be noise or errors in the collected data. GPS drift or reflection of GPS signals from buildings, geographic features or other obstructions may result in incorrect reports. Depending on the type of device used to report location, the telemetry data that is collected may be noisy. In fact, many mobile devices report data that is so noisy that it is unusable at the collecting computer. This severely limits the potential uses of telemetry data from mobile computing devices. Thus, improved methods of filtering noise from telemetry data are needed.

BRIEF DESCRIPTION OF THE DRAWINGS

In the drawings:

FIG. 3A and FIG. 3B graphically illustrate an example implementation of filtering noise from telemetry data.

FIG. 4 illustrates a computer system upon which an embodiment may be implemented.

DETAILED DESCRIPTION OF EXAMPLE EMBODIMENTS

Figure 1:
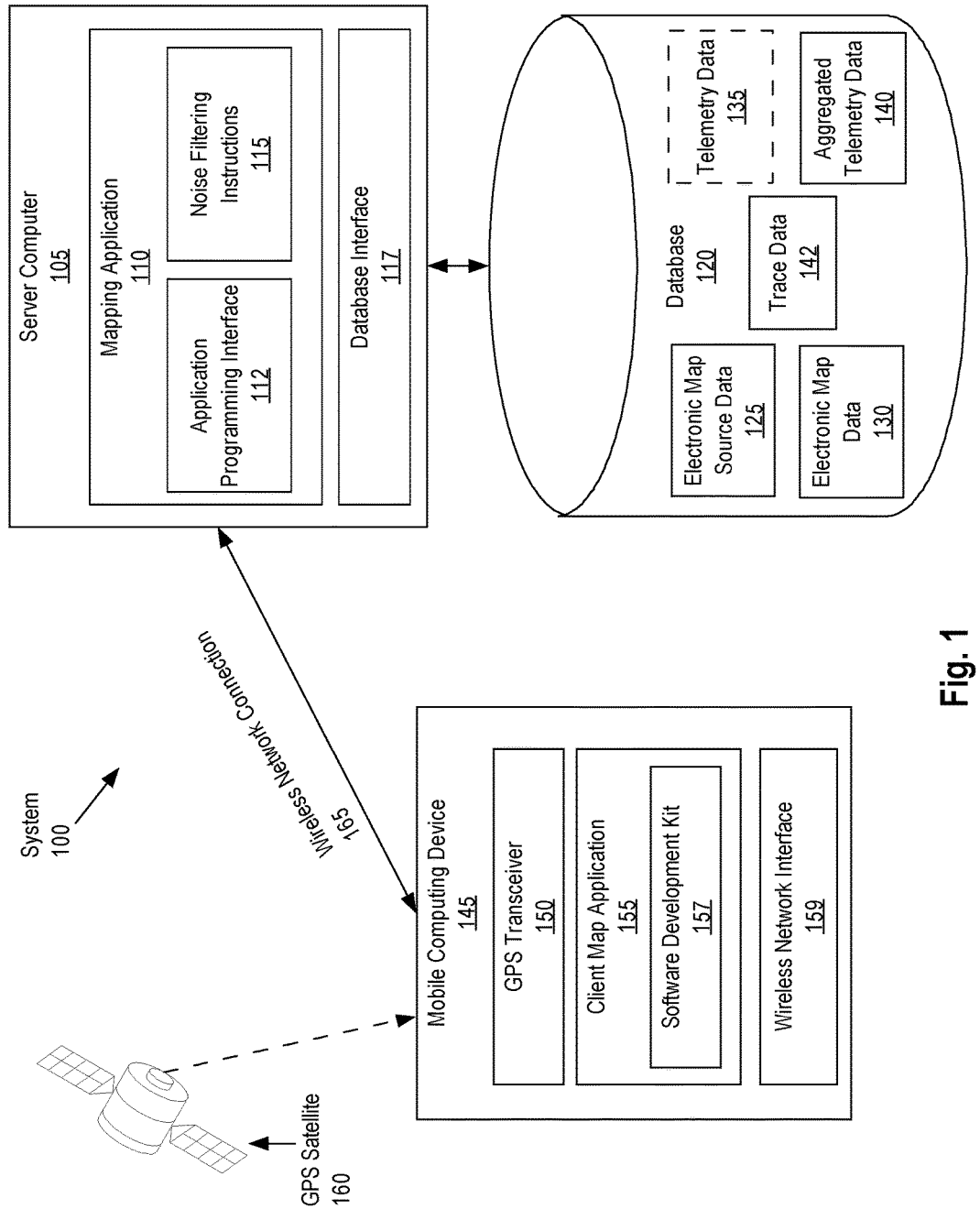
FIG. 1 illustrates an example computer system in which the techniques described may be practiced, according to one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections according to the following outline:

1. Overview
2. Example Computer System Implementation
3. Example Functional Implementation
4. Example Filtering of Noise from Telemetry Data
5. Hardware Overview

1. Overview

Computer-implemented techniques are provided for filtering noise from telemetry data. "Noise," in this context, may be reported real-world location data that does not accurately identify the true geographic position of a mobile computing device due to one or more of a variety of factors. Example causes of noise include, but are not limited to: reflection from tall buildings or geographic features or other sources, varying quality levels of GPS receivers in mobile devices, varying power levels of GPS receivers in mobile devices, other physical limitations of mobile devices, and user or application imposed limitations in GPS accuracy. Additional source of noise may be incorrectly configured mobile computing devices, which can result in telemetry data from the future if the date/time is incorrect on the mobile computing device.

In various embodiments, telemetry data is received from mobile computing devices. The telemetry data includes many values of probes. Each probe is a report consisting of a plurality of data values identifying a location of the mobile computing device at the time of the report. Each of the probes may include values for latitude, longitude, time, and/or height, for example. A plurality of probes from a single mobile computing device, when considered together, may form a trace representing a path of movement of the mobile computing device. Obtaining a trace is of particular use when the mobile computing device is traveling in a vehicle, such as a bicycle, car, or train. The mobile computing devices may be many different types of physical devices, as discussed below, although the mobile computing devices are typically smartphones.

Telemetry data received from mobile computing devices may have one or more instances of poor quality data. In an embodiment, a plurality of individual probes that form a trace are examined. In one approach, for a given probe value, additional attributes for the probe are determined or calculated using one or more other probe values that were received immediately before or after the given probe, or both. The probes immediately before or after a given probe may not be used if, for example, the probes immediately before or after are determined to be bad data. If the probes immediately before or after contain bad telemetry data, then the next or prior good probe, or both, may be used. Alternatively, any configuration of good probes or telemetry data may be used to determine the additional attributes. Example additional attributes include, but are not limited to: speed, acceleration, deceleration, trajectory change, distance, or duration. Each attribute is compared to a corresponding stored threshold value, and a determination is made whether the threshold is satisfied.

For example, a speed threshold value may be 90 miles per hour. For this threshold value, if a given probe and one or more other probe values indicate a speed of motion in excess of 90 miles per hour, then the threshold is satisfied and the given probe may represent noise. While 90 miles per hour may be the true speed of a vehicle that is carrying a mobile computing device, it may indicate noise if analysis of sets of immediately earlier and later probes indicates speeds that are much lower. The foregoing is merely one example of a heuristic that can be implemented in computer-executed steps to identify noise in probe data.

In one embodiment, if the threshold value is satisfied, then the given probe is deleted, and the trace is then split or divided into two traces. This is repeated for each probe. In some cases, a trace representing a complete trip of a mobile computing device from a starting point to a destination may be split into many different traces.

The traces resulting from this process may also be filtered using, for example, a minimum number of probes as a threshold. The resulting traces may be stored, optionally using anonymization to enforce privacy rules, and may be used by a variety of applications or algorithms. Alternatively, the traces may have been anonymized prior to beginning the process described herein.

In one embodiment, a data processing method providing an improvement in filtering telemetry data received from mobile devices comprises receiving, from a mobile device, telemetry data comprising a plurality of probes, each probe identifying a location of the mobile device at a time of the probe, wherein the plurality of probes form a first digital trace data identifying a path of the mobile device; determining, for a particular probe of the plurality of probes, a first attribute of the particular probe; determining whether the first attribute of the particular probe satisfies a first threshold; in response to satisfying the first threshold, deleting the particular probe from the plurality of probes and dividing the first digital trace data into a second digital trace data and a third digital trace data; performing an action using the second digital trace data and the third digital trace data.

Other embodiments, aspects and features will become apparent from the disclosure as a whole.

2. Example Computer System Implementation

FIG. 1 illustrates an example computer system in which the techniques described may be practiced, according to one embodiment.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a mobile computing device 145 that is coupled via a wireless network connection 165 to a server computer 105, which is coupled to a database 120. A GPS satellite is coupled via a wireless connection to the mobile computing device 145. The server computer 105 comprises a mapping application 110, an application programming interface (API) 112, noise filtering instructions 115 and a database interface 117. The database 120 comprises electronic map source data 125, electronic map data 130, telemetry data 135, aggregated telemetry data 140 and trace data 142. The mobile computing device 145 comprises a GPS transceiver 150, client map application 155, software development kit (SDK) 157 and wireless network interface 159.

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 105 broadly represents one or multiple server computers, such as a server cluster, and the server computer may be located in one or more physical locations. Server computer 105 also may represent one or more virtual computing instances that execute using one or more computers in a datacenter such as a virtual server farm.

Server computer 105 is communicatively connected to database 120 and mobile computing device 145 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110, and may include other applications, software, and other executable instructions, such as database interface 117, to facilitate various aspects of embodiments described herein.

In one embodiment, database interface 117 is a programmatic interface such as JDBC or ODBC for communicating with database 120. Database interface 117 may communicate with any number of databases and any type of database, in any format. Database interface 117 may be a piece of custom software created by an entity associated with mapping application 110, or may be created by a third party entity in part or in whole.

In one embodiment, database 120 is a data storage subsystem consisting of programs and data that is stored on any suitable storage device such as one or more hard disk drives, memories, or any other electronic digital data recording device configured to store data. Although database 120 is depicted as a single device in FIG. 1, database 120 may span multiple devices located in one or more physical locations. For example, database 120 may include one or nodes located at one or more data warehouses. Additionally, in one embodiment, database 120 may be located on the same device or devices as server computer 105. Alternatively, database 120 may be located on a separate device or devices from server computer 105.

Database 120 may be in any format, such as a relational database, a noSQL database, or any other format. Database 120 is communicatively connected with server computer 105 through any kind of computer network using any combination of wired and wireless communication of the type previously described. Optionally, database 120 may be communicatively connected with other components, either directly or indirectly, such as one or more third party data suppliers. Generally, database 120 stores data related to electronic maps including, but not limited to: electronic map source data 125, electronic map data 130, telemetry data 135, aggregated telemetry data 140, and trace data 142. These datasets may be stored as columnar data in a relational database or as flat files.

In one embodiment, electronic map source data 125 is raw digital map data that is obtained, downloaded or received from a variety of sources. The raw digital map data may include satellite images, digital street data, building or place data or terrain data. Example sources include National Aeronautics and Space Administration (NASA), United States Geological Survey (USGS), and DigitalGlobe. Electronic map source data 125 may be updated at any suitable interval, and may be stored for any amount of time. Once obtained or received, electronic map source data 125 is used to generate electronic map data 130.

In one embodiment, electronic map data 130 is digital map data that is provided, either directly or indirectly, to client map applications, such as client map application 155, using an API. Electronic map data 130 is based on electronic map source data 125. Specifically, electronic map source data 125 is processed and organized as a plurality of vector tiles which may be subject to style data to impose different display styles. Electronic map data 130 may be updated at any suitable interval, and may include additional information beyond that derived from electronic map source data 125. For example, using aggregated telemetry data 140, discussed below, various additional information may be stored in the vector tiles, such as traffic patterns, turn restrictions, detours, common or popular routes, speed limits, new streets, and any other information related to electronic maps or the use of electronic maps.

In one embodiment, telemetry data 135 is digital data that is obtained or received from mobile computing devices via function calls that are included in a Software Development Kit (SDK) that application developers use to integrate and include electronic maps in applications. As indicated by the dotted lines, telemetry data 135 may be transiently stored, and is processed as discussed below before storage as aggregated telemetry data 140.

The telemetry data may include mobile device location information based on GPS signals. For example, telemetry data 135 may comprise one or more digitally stored events, in which each event comprises a plurality of event attribute values. Telemetry events may include: session start, map load, map pan, map zoom, map tilt or rotate, location report, speed and heading report, or a visit event including dwell time plus location. Telemetry event attributes may include latitude-longitude (latlong) values for the then-current position of the mobile device, a session identifier, instance identifier, application identifier, device data, connectivity data, view data, and timestamp.

In one embodiment, aggregated telemetry data 140 is telemetry data 135 that has been processed using anonymization, chunking, filtering, or a combination thereof. Anonymization may include removing any data that identifies a specific mobile device or person. Chunking may include segmenting a continuous set of related telemetry data into different segments or chunks representing portions of travel along a route. For example, telemetry data may be collected during a drive from John's house to John's office. Chunking may break that continuous set of telemetry data into multiple chunks so that, rather than consisting of one continuous trace, John's trip may be from John's house to point A, a separate trip from point A to point B, and another separate trip from point B to John's office. Chunking may also remove or obscure start points, end points, or otherwise break telemetry data into any size. Filtering may remove inconsistent or irregular data, delete traces or trips that lack sufficient data points, or exclude any type or portion of data for any reason. Once processed, aggregated telemetry data 140 is stored in association with one or more tiles related to electronic map data 130. Aggregated telemetry data 140 may be stored for any amount of time, such as a day, a week, or more. Aggregated telemetry data 140 may be further processed or used by various applications or functions as needed.

In one embodiment, trace data 142 is a set of aggregated telemetry data that represents the movement of a mobile device from a first point to a second point. A particular trace may contain two or more GPS data points, or probes, depending on the length of the trace and how frequently GPS data was provided from an associated mobile computing device. As a result of the processes described herein, or other processes, a particular trace data item does not necessarily correlate to a complete real-world movement of an associated mobile device. Trace data 142 may be stored for any amount of time. Trace data 142 is a result of filtering telemetry data 135 or aggregated telemetry data 140.

In one embodiment, mobile computing device 145 is any mobile computing device, such as a laptop computer, handheld computer, wearable computer, cellular or mobile phone, portable digital assistant (PDAs), GPS or other dongle, any portable navigation device, or tablet computer. Additionally or alternatively, mobile computing device 145 is a navigation system installed in a car or other vehicle. Although a single mobile computing device is depicted in FIG. 1, any number of mobile computing devices may be present. Each mobile computing device 145 is communicatively connected to server computer 105 through wireless network connection 165 which comprises any combination of a LAN, a WAN, one or more internetworks such as the public Internet, a cellular network, or a company network.

Mobile computing device 145 is communicatively coupled to GPS satellite 160 using GPS transceiver 150. GPS transceiver 150 is a transceiver used by mobile computing device 145 to receive signals from GPS satellite 160, which broadly represents three or more satellites from which the mobile computing device may receive signals for resolution into a latitude-longitude position via triangulation calculations.

Mobile computing device 145 also includes wireless network interface 159 which is used by the mobile computing device to communicate wirelessly with other devices. In particular, wireless network interface 159 is used to establish wireless network connection 165 to server computer 105. Wireless network interface 159 may use WiFi, WiMAX, Bluetooth, ZigBee, cellular standards or others.

Mobile computing device 145 also includes other hardware elements, such as one or more input devices, memory, processors, and the like, which are not depicted in FIG. 1. Mobile computing device 145 also includes applications, software, and other executable instructions to facilitate various aspects of embodiments described herein. These applications, software, and other executable instructions may be installed by a user, owner, manufacturer, or other entity related to mobile computing device. In one embodiment, mobile computing device 145 includes client map application 155 which is software that displays, uses, supports, or otherwise provides electronic mapping functionality as part of the application or software. Client map application 155 may be any type of application, such as a taxi service, a video game, a chat client, a food delivery application, etc. In an embodiment, client map application 155 obtains electronic mapping functions through SDK 157, which may implement functional calls, callbacks, methods or other programmatic means for contacting the server computer to obtain digital map tiles, layer data, or other data that can form the basis of visually rendering a map as part of the application. In general, SDK 157 is a software development kit that allows developers to implement electronic mapping without having to design all of the components from scratch. For example, SDK 157 may be downloaded from the Internet by developers, and subsequently incorporated into an application which is later used by individual users.

In server computer 105, the mapping application 110 provides the API 112 that may be accessed, for example, by client map application 155 using SDK 157 to provide electronic mapping to client map application 155. Specifically, mapping application 110 comprises program instructions that are programmed or configured to perform a variety of backend functions needed for electronic mapping including, but not limited to: sending electronic map data to mobile computing devices, receiving telemetry data 135 from mobile computing devices, processing telemetry data to generate aggregated telemetry data 140, generating trace data 142, organizing trace data 142, receiving electronic map source data 125 from data providers, processing electronic map source data 125 to generate electronic map data 130, and any other aspects of embodiments described herein. Mapping application 110 includes noise filtering instructions 115 which are programmed or configured to filter noise from telemetry data. Specifically, noise filtering instructions 15 may filter noise from telemetry data 135, aggregated telemetry data 140, or trace data 142.

In one embodiment, noise filtering instructions 115 are programmed or configured to perform identifying prior and subsequent probes for a given probe of a trace. The prior and subsequent probes may be identified based upon earlier or later time values. For example, the probes may be ordered according to the time value of the probe, and the prior and subsequent probes identified based on the time values.

In one embodiment, noise filtering instructions 115 are programmed or configured to determine attributes of a probe. The attributes may be determined using the given probe, a prior probe, a subsequent probe, or a combination thereof, and using one or more probe values at those points, in various embodiments. Attributes may include, but are not limited to: speed, acceleration, deceleration, trajectory change, distance, and a duration value. Speed indicates the speed of the mobile computing device at the time of the probe. Acceleration indicates a rate of acceleration of the mobile computing device at the time of the probe. Deceleration indicates a rate of deceleration of the mobile device at the time of the probe. Trajectory change indicates how much of a change in the direction of travel there has been relative to the prior probe, the subsequent probe, or both. Distance indicates how far apart the probe is from prior or subsequent probes, or both. Duration indicates how much time has passed since a prior probe, until a subsequent probe, or both. Any number of attributes may be determined. The number of attributes determined may vary based on a use of the data after filtering. In one embodiment, attributes may be determined without using a prior or subsequent probe. For example, attributes may be determined based on data of the given probe, such as a time or date. If the time or date is incorrect or invalid, then the probe likely contains low quality telemetry data.

In one embodiment, noise filtering instructions 115 are programmed or configured to perform setting thresholds for attributes. Each attribute may have a different threshold, and the thresholds may vary based on the use of the data after filtering. The thresholds may be set based on specific values, such as 100 miles per hour or 15 seconds. Alternatively, the thresholds may be set based on a percentage, a relative amount or any other standard. Depending on the attribute, the threshold may be satisfied by exceeding the threshold, or by failing to meet the threshold.

In one embodiment, noise filtering instructions 115 are programmed or configured to perform determinations of whether attributes of a probe satisfy thresholds. The determinations may be made in a predetermined order, such as beginning with the threshold which is most commonly satisfied and ending with the least commonly satisfied threshold, or in any other order. The determination is made for each probe in a trace. The determination that a threshold is satisfied may be made in any suitable manner. When a threshold is satisfied, the associated probe is likely noise, and will be deleted as discussed below. If a threshold is not satisfied, then the associated probe may not be noise, and is not deleted.

In one embodiment, noise filtering instructions 115 are programmed or configured to delete probes in response to satisfying thresholds and splitting traces into multiple traces. Satisfying a single threshold indicates that the probe is likely noise and thus should be deleted. The probes may be deleted by erasing it from digital memory or storage using a write or update operation.

When a probe is deleted, in an embodiment, rather than interpolating data for the probe, the trace is divided into two or more new traces. For example, if a trace contains 256 probes having identifier values from 0 to 255, and probe number 48 is determined to be noise, then the trace would be split into two traces, with the first trace containing probe numbers 0 to 47, and the second trace containing probe numbers 49 to 255. Dividing may comprise writing one set of probe values to a new storage location, changing identifier values, creating or updating pointer values or other references, or other techniques. The identifier values and probe numbers given in this example are hypothetical, and other values may be used in various embodiments. The dividing of traces into multiple traces may be performed directly after a deletion, or may be performed at a subsequent point, such as after all probes in a particular trace have been filtered or processed.

In one embodiment, noise filtering instructions 115 are programmed or configured to store trace data. The new traces resulting from division operations are stored in memory, a flat file, a database or other electronic digital storage medium.

Once stored, the trace data may be used in a variety of applications. In particular, due to the quality of the resulting trace data, and because the trace data was not matched or otherwise linked to an electronic map prior to filtering, the trace data may be used to improve electronic maps, among other applications or uses.

In one embodiment, noise filtering instructions 115 are programmed or configured to perform filtering of traces. The traces may be filtered using a threshold count or amount of probes. In other words, if a trace does not contain a specified minimum number of probes, the trace is deleted. The threshold may be any amount, such as four probes. In particular, the filtering of traces is used when one trace has been split into many traces, as some of the newly created traces may contain insufficient probes to be accurate or useful. Alternatively, the traces may be filtered using any other basis, for any other reason, or at any time.

3. Example Functional Implementation

Figure 2:
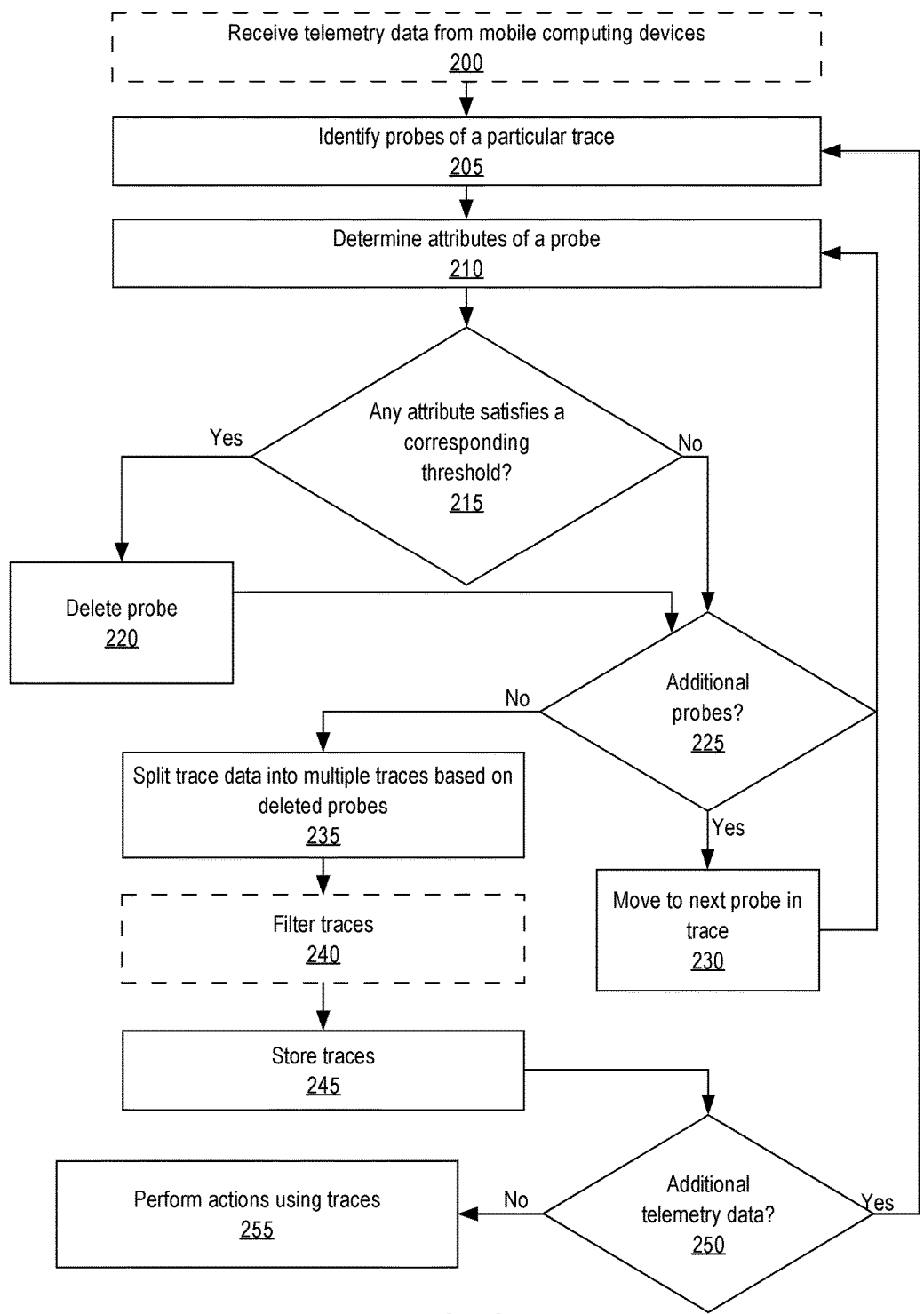
FIG. 2 illustrates a programmable algorithm or method in accordance with an embodiment.

FIG. 2 illustrates an example programmable algorithm or method for filtering noise from telemetry data. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 200, telemetry data is received from mobile computing devices. As indicated by the dotted lines, the telemetry data may be received before the method of FIG. 2 begins, while the method of FIG. 2 is performed, or at any other time. The telemetry data may be received from any number of mobile computing devices, and may contain any suitable information. Typically, the telemetry data is received in the form of probes, which identify a location of a mobile computing device at the time of the probe. When considered together, multiple probes from a single mobile computing device form a trace, which represents the path of a mobile computing device over a period of time. For example, a trace may represent a trip from a workplace to a restaurant.

In step 205, the probes of a particular trace are identified. Any number of probes may be identified in a particular trace, and the probes may be identified in any suitable manner. In particular, for a given probe, the prior and the subsequent probe are identified for use in subsequent steps. Optionally, multiple prior and subsequent probes may be identified, such as 2 prior and 3 subsequent, or any other amount of prior and subsequent probes.

In step 210, the attributes of a probe are determined. The attributes of a probe are determined using zero or more prior probes, subsequent probes, or any combination thereof. In one embodiment, the prior probe and the subsequent probe, or a combination thereof, may be used. Alternatively, the attributes may be determined using additional probes or different probes than the prior probe, the subsequent probe, or both. For example, a probe that is two probes before the particular probe and a probe that is three probes after the particular probe may be used, or any other combination. Which probes are used in determining the attributes may be based on any suitable factors, such as whether the probes contain good or bad telemetry data. As an example, no prior or subsequent probes may be used when the attribute is based on a time value, and the current probe contains a date or time from the future, and therefore clearly incorrect. Attributes of a probe include, but are not limited to: a speed value, an acceleration value, a deceleration value, a trajectory change value, distance, or a duration value. Any number of attributes may be determined for a probe. Each attribute has an associated threshold. The thresholds may be set to any suitable amount by any entity. The thresholds may vary by attribute, may vary based on an application or intended use of the telemetry data, or may vary based on any other reason. Typically, the thresholds are set such that noisy, inaccurate or faulty probes are identified and removed, as discussed below.

In step 215, a determination is made whether any attribute satisfies a corresponding threshold. If any attribute does satisfy a threshold, the method proceeds to step 220. If no thresholds are satisfied, the method proceeds to step 225. Satisfying even a single threshold indicates that the probe is likely inaccurate or otherwise is low quality, and results in the method proceeding to step 220. Thus, even if a probe has eight attributes, and only a single one of the eight satisfies a threshold, the method still proceeds to step 220.

In step 220, the probe is deleted. The probe may be deleted in any manner. By deleting the probe, the quality of the telemetry data is increased, and allows for more complicated and demanding calculations or actions to be performed using the telemetry data.

In step 225, a determination is made whether there are additional probes in the trace. The determination may be made in any way. If there are additional probes, the method proceeds to step 230. If there are not additional probes, the method proceeds to step 235.

In step 230, the method moves to the next probe in the trace, and returns to step 210 to determine the attributes of the next probe.

In step 235, the trace data is divided into multiple traces based on deleted probes. A single trace representing a complete trip between endpoints or destinations may be split into any number of new traces, depending on how many probes were deleted from the complete trace. For example, if a trace originally contains 30 probes, and probes 5, 15, and 20 are deleted, then the trace will be split into 4 traces that contain original probes 1 to 4, 6 to 14, 16 to 19, and 21 to 30, respectively. Optionally, step 235 may be performed at a different time, such as directly after the deletion of a probe, or at any other time.

In step 240, the traces are filtered. As indicated by the dotted line, step 240 is optional, and may not be performed or may be performed at a different time than the location shown in FIG. 2. The traces may be filtered based on any attribute, feature, or other aspect. Specifically, since some traces may have been split into multiple traces, the traces may be filtered based on a number of probes the traces contain. The threshold amount of probes may be set to any amount, such as 0, 2, 4, 7, or any other number of probes. If the trace does not have the minimum number of probes, the trace and the associated probes are deleted.

In step 245, the traces are stored. The traces may be stored in a database or any other suitable electronic digital storage medium. The traces may be stored for any amount of time. In one embodiment, the traces are not stored individually. Rather, the traces are aggregated for use in various types of actions or analysis, and the individual traces are subsequently deleted.

In step 250, a determination is made whether there is additional telemetry data to filter. If there is additional telemetry data, a next trace is selected and the method returns to step 205 to identify the probes of the next trace. If there is not additional telemetry data, the method proceeds to step 255.

In step 255, actions are performed using the traces or aggregated trace data. Many different actions may be performed with the trace data, such as determining improvements to electronic maps such as identifying lanes of roads, identifying turn restrictions, identifying new roads, determining traffic patterns, sending a notification, performing analytics or other analysis, or any other action. The actions performed using the traces or aggregated trace data may influence the thresholds or filter parameters described above. For example, determining the speed of traffic requires highly accurate speed data and thus requires strict thresholds and filters. Conversely, determining a missing street does not require highly accurate speed data, and thus would require less strict thresholds and filters.

Using this process, previously unusable telemetry data from mobile computing devices may be made useable. Rather than discarding traces or probes that represent noise, the methods herein result in creating and storing more accurate data and building larger sets of usable data. The method disclosed herein may improve the quality of telemetry data received from mobile computing devices so that the filtered telemetry data is approximately the quality expected from high-accuracy computing devices. The disclosed methods provide useful benefits because the quantity of telemetry data available from mobile computing devices is large, and previously was unusable for many actions or analysis that requires high quality telemetry data. By increasing the quality of the telemetry data, new actions or analysis may be performed using the large amount of telemetry data available from mobile computing devices. Consequently, the techniques herein can permit processing data with fewer CPU cycles because server computers and other processors are not required to execute error routines when noisy or erroneous data is encountered.

4. Example Filtering of Noise from Telemetry Data

FIG. 3A and FIG. 3B illustrate an example of filtering noise from telemetry data in accordance with an embodiment.

In the embodiment of FIG. 3A, telemetry data has been received from a mobile computing device. The telemetry data is shown as trace 300, which includes a variety of probes. The probes are connected with lines to aid in more clearly illustrating the example. Trace 300 represents the movement of a mobile computing device as the user of the mobile computing device rides in a car along straight road. Trace 300 shows that the car sped up and slowed down a few times, as shown by the variable distances between probes, and includes probe D 320, which is a noisy or inaccurate probe, as the location of probe D 320 was influenced by GPS drift. The process of filtering probe D 320 from trace 300 is discussed in detail below.

Specifically, trace 300 includes probe A 305, probe B 310, probe C 315, probe D 320, probe E 325, probe F 330, and probe G 335. In the process of filtering trace 300, attributes are determined for each probe, beginning with probe A 305, and continuing until the end of trace 300 at probe G 335. As discussed above, the attributes may be anything including speed, acceleration, deceleration, trajectory change, distance, or duration. For this example, the attributes of probe D 320 are of interest.

When determining the attributes of probe D 320, the prior probe, probe C 315, and the subsequent probe, probe E 325, may be used. The attributes of probe D 320 include a large amount of acceleration and a high speed, as probe D 320 has drifted and the location is incorrect. When the thresholds for acceleration or speed are checked against the acceleration or speed of probe D 320, the threshold is satisfied, thus indicating that probe D 320 is noisy and should be deleted. FIG. 3B shows the deletion of probe D 320.

In the embodiment of FIG. 3B, probe D 320 of FIG. 3A has been deleted. Subsequently, two new traces have been created, trace A 340 and trace B 345. In other words, trace 300 of FIG. 3A has been split into trace A 340 and trace B 345. Trace A 340 includes probe A 305, probe B 310, and probe C 315, while trace B 345 includes probe E 325, probe F 330, and probe G 335.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and stored in storage device 410, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method for filtering noise from telemetry data received from a mobile device of a plurality of mobile devices, the method comprising:

receiving, from the mobile device, the telemetry data comprising a plurality of probes, each probe of the plurality of probes identifying a location of the mobile device at a time of said each probe, wherein the plurality of probes forms a first digital trace identifying a path of the mobile device and comprises a series of probes of the plurality of probes that begins with a first probe, ends with a last probe, and includes a particular probe;

determining, for the particular probe of the plurality of probes, a value for a first attribute of a plurality of attributes of the particular probe from the received telemetry data;

determining a first stored threshold value for the first attribute above which corresponds to a noise value for the first attribute;

comparing the determined particular probe value for the first attribute for the particular probe to the first stored threshold value for the first attribute;

in response to the determined particular probe value for the first attribute exceeding the first stored threshold:

deleting the particular probe from the plurality of probes; and creating, from the series of probes remaining in the first digital trace, a second digital trace and a third digital trace, wherein the second digital trace begins with the first probe and ends with a second probe immediately preceding the particular probe in the series of probes, and the third digital trace begins with a third probe immediately following the particular probe in the series of probes and ends with the last probe;

storing the second digital trace and the third digital trace, wherein the first stored threshold varies based on an action to be taken using the second digital trace and the third digital trace; and determining whether the second digital trace or the third digital trace satisfy a third threshold for a minimum number of probes of the plurality of probes;

in response to the second digital trace or the third digital trace not satisfying the third threshold, deleting the second digital trace or the third digital trace.

2. The method of claim 1, further comprising:

determining, for the particular probe, a second attribute of the particular probe;

determining whether the second attribute of the particular probe satisfies a second threshold;

deleting the particular probe in response to the first attribute satisfying the first threshold or the second attribute satisfying the second threshold.

3. The method of claim 1, wherein the first attribute is: a speed value, an acceleration value, a deceleration value, a trajectory change value, a distance value, or a duration value.

4. The method of claim 1, wherein the mobile device is a smartphone.

5. The method of claim 1, wherein the first attribute is determined using at least a prior probe or a subsequent probe, wherein the second digital trace data ends on the prior probe, and wherein the third digital trace data begins on the subsequent probe.

6. The method of claim 1, wherein the received telemetry data has not been matched to an electronic map.

7. The method of claim 1, wherein the action comprises improving an electronic map.

8. The method of claim 1, further comprising:

performing the method of claim 1 for a plurality of telemetry data received from a plurality of mobile devices.

9. A system comprising:

a database;

one or more servers communicatively connected to the database, the one or more servers comprising one or more processors and electronic digital memory storing one or more sequences of instructions which, when executed by the one or more processors, cause the one or more processors to perform:

receiving, from a mobile device, telemetry data comprising a plurality of probes, each probe identifying a location of the mobile device at a time of said each probe, wherein the plurality of probes forms a first digital trace identifying a path of the mobile device and comprises a series of probes of the plurality of probes that begins with a first probe, ends with a last probe, and includes a particular probe;

determining, for the particular probe of the plurality of probes, a value for a first attribute of a plurality of attributes of the particular probe from the received telemetry data;

determining a first stored threshold value for the first attribute above which corresponds to a noise value for the first attribute;

comparing the determined particular probe value for the first attribute for the particular probe to the first stored threshold value for the first attribute;

in response to the determined particular probe value for the first attribute exceeding the first threshold:

deleting the particular probe from the plurality of probes; and creating, from the series of probes of the plurality of probes remaining in the first digital trace, a second digital trace and a third digital trace, wherein the second digital trace begins with the first probe and ends with a second probe immediately preceding the particular probe in the series of probes, and the third digital trace begins with a third probe immediately following the particular probe in the series of probes and ends with the last probe;

storing the second digital trace and the third digital trace, wherein the first threshold varies based on an action to be taken using the second digital trace and the third digital trace; and determining whether the second digital trace or the third digital trace satisfy a third threshold for a minimum number of probes of the plurality of probes;

in response to the second digital trace or the third digital trace not satisfying the third threshold, deleting the second digital trace or the third digital trace.

10. The system of claim 9, the instructions further causing the one or more processors to perform:

determining, for the particular probe, a second attribute of the particular probe;

determining whether the second attribute of the particular probe satisfies a second threshold;

deleting the particular probe in response to the first attribute satisfying the first threshold or the second attribute satisfying the second threshold.

11. The system of claim 9, wherein the first attribute is: a speed value, an acceleration value, a deceleration value, a trajectory change value, a distance value, or a duration value.

12. The system of claim 9, wherein the mobile device is a smartphone.

13. The system of claim 9, wherein the first attribute is determined using at least a prior probe or a subsequent probe, wherein the second digital trace ends on the prior probe, and wherein the third digital trace begins on the subsequent probe.

14. The system of claim 9, wherein the received telemetry data has not been matched to an electronic map.

15. The system of claim 9, wherein the action comprises improving an electronic map.

16. The system of claim 9, the instructions further causing the one or more processors to perform:

performing the steps of claim 9 for a plurality of telemetry data received from a plurality of mobile devices.

* * * * *